United States Patent [19]
Anderson

[11] 3,785,300
[45] Jan. 15, 1974

[54] VEHICLE SNACK TRAY

[76] Inventor: Robert K. Anderson, 638 N. Dellrose, Wichita, Kans. 67208

[22] Filed: Apr. 10, 1972

[21] Appl. No.: 242,415

[52] U.S. Cl. .................................................. 108/44
[51] Int. Cl. ............................................ A47b 37/00
[58] Field of Search .................. 108/45, 134, 80–82; 211/DIG. 1; 287/99; 245/290, 291, 292; 5/57 B

[56] References Cited
UNITED STATES PATENTS

| 524,824 | 8/1894 | Hiser ..................................... 5/57 B |
| 1,266,232 | 5/1918 | Downie .................................. 5/57 B |
| 2,270,948 | 1/1942 | Howe ..................................... 108/45 |
| 3,113,533 | 12/1963 | Snow ............................... 108/134 X |
| 2,825,611 | 3/1958 | Aynesworth .......................... 108/45 |
| 1,198,227 | 9/1916 | Hinchey ......................... 211/DIG. 1 |
| 2,031,759 | 2/1936 | Casper ................................... 108/81 |
| 2,284,003 | 5/1942 | Lupert ................................... 108/81 |
| 2,329,293 | 9/1943 | Predit ..................................... 108/81 |
| 2,352,837 | 7/1944 | Hillenbrand ...................... 108/81 X |
| 2,835,522 | 5/1958 | Serto ...................................... 287/99 |
| 3,280,765 | 10/1966 | Storms ................................. 108/45 |

FOREIGN PATENTS OR APPLICATIONS

| 769,119 | 2/1957 | Great Britain ...................... 108/81 |

*Primary Examiner*—Paul R. Gilliam
*Assistant Examiner*—G. O. Finch
*Attorney*—John H. Widdowson

[57] ABSTRACT

Tray apparatus has a mount with an arm pivotally secured thereto. A tray is pivotally secured to the outer end of the arm. A lock fixes the positions of the mount and the arm in the extended position. It preferably has means to secure the tray in a storage position. The tray apparatus is adapted to pivot between an extended position where it is locked for use and a folded storage position.

1 Claim, 4 Drawing Figures

PATENTED JAN 15 1974 3,785,300

VEHICLE SNACK TRAY

Numerous types of foldable, collapsible, and swingable trays are known in the prior art to be used in passenger vehicles for the convenience of the passengers in setting or containing snacks, pop bottles, beer cans and other snack type items commonly consumed in travel. However, these prior art trays which are adapted for automobiles have several disadvantages. A first and primary disadvantage with these prior art devices is that they are complicated structurally, thus difficult to manufacture and expensive to produce. Other disadvantages relate to the size of the tray and the storability of the tray when it is not being used. Generally, these trays and other like devices are mounted under the dash portion of the vehicle interior and, depending on the particular tray or container, require one, two, or more mounting points for the device for its correct operation when installed. Many of these prior art devices require a large amount of under-the-dash space for the device to be installed and for it to operate properly. This sometimes presents a problem with late model automobiles and other motor vehicles because the under-the-dash space is quite restricted due to heating ducts, air-conditioning ducts and equipment associated with these devices which is today common to a great number of such vehicles. For this reason some of the prior art devices simply wll not fit or operate under the dash of late model vehicles.

In one preferred specific embodiment an auto snack tray structure includes a mount securable to the lower forward portion of a vehicle dash board structure with an elongated arm pivotally connected to the mount, and a tray pivotally connected to the other end of the arm adapted to be supported in a substantially horizontal position when in an extended position and adapted to fold to a storage position under the dash board structure wherein the tray is in an upright position adjacent to the vehicle firewall or forward portion of the underdssh area. This tray device includes a lock to hold the arm in the extended position at the mount and to unlock allowing rotation of the arm about the mount to the storage position. It also includes a magnetic member on the tray to attach it to a metallic contact surface on the under-dash area. The tray member of this device is freely pivotable about the end of the arm member and is attached to the arm by a pivotal mount on the upper surface of the tray at an interior portion so that when the tray is in the normally extended portion an outer portion of the tray rests against the arm at a point between its pivots, and the tray is in a substantially horizontal position. When the tray device is folded to the storage position, the tray member pivots about the end of the arm member so in the storage position the arm member is in a nearly horizontal position and the tray member is in an upright position. The lock is adapted to be engaged when the tray device is in the extended position and adapted to hold the arm member in a fixed relation to the mount member. The lock is released before moving the tray device to the storage position.

One object of this invention is to provide a vehicle snack tray structure overcoming the aforementioned disadvantages of the prior art devices.

Still another object of this invention is to provide a snack tray mountable with the dash structure of a vehicle having a mount secured to the dash structure, an arm pivotally attached to the mount and extendable to support a pivotally attached tray on its outer end.

Still, one other object of this invention is to provide a vehicle snack tray having a tray member freely pivotable about the outer end portion of a supporting arm structure, with the tray extendable for normal use to a horizontal position supported by the pivot and the supporting arm.

Yet, one other object of this invention is to provide a vehicle snack tray structure having a tray pivotally mounted on an arm structure mountable with a vehicle dash structure, the tray having a magnetic member adapted to secure the tray to the vehicle structure when in a storage position.

Yet, one further object of this invention is to provide a vehicle snack tray structure with a pivotable arm structure supporting a tray, the arm structure having a lock to hold the arm structure in an extended and rigid use position, and having a spring adapted to retract the structure from the locked position to a storage position.

Various other objects, advantages, and features of the invention will become apparent to those skilled in the art from the following discussion, taken in conjunction with the accompanying drawings in which.

Figure 1:
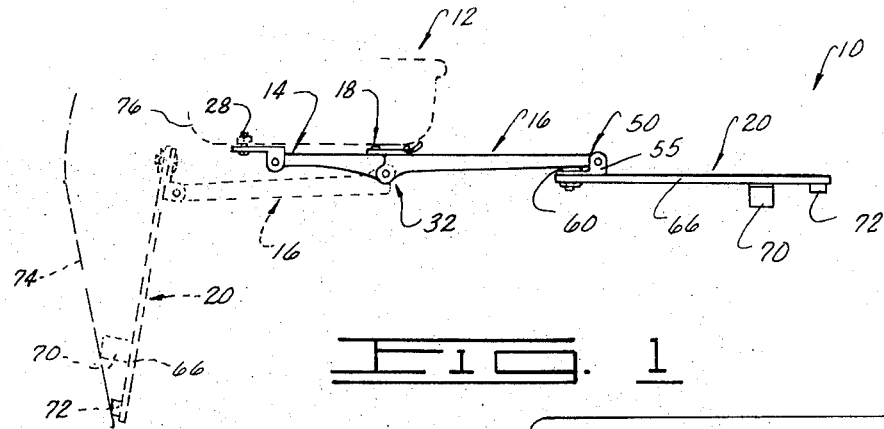
FIG. 1 is a side elevation view of the vehicle snack tray structure attached to a supporting structure, shown in dashed lines, with the snack tray shown in the extended position in solid lines and with the snack tray shown in the storage position and attached to another portion of the supporting structure in dashed lines.

The following is a discussion and description of preferred specific embodiments of the vehicle snack tray structure of this invention, such being made with reference to the drawings, whereupon the same reference numerals are used to indicate the same or similar parts and/or structure. It is to be understood that such discussion and description is not to unduly limit the scope of the invention.

Referring to the drawing in detail and in particular to FIG. 1, a vehicle snack tray structure of this invention, indicated generally at 10, is shown attached to a supporting structure, generally indicated at 12. The snack tray structure 10 includes a mount 14 securable to the supporting structure 12, an arm 16 pivotally secured to the mount 14 with a lock assembly 18 at the junction, and a tray 20 pivotally secured to the outer end of the arm 16. FIG. 1 shows the snack tray structure 10 in the extended normal use position in solid lines and in the folded storage position in dashed lines. The supporting structure 12 on which the mount 14 is secured is intended to illustrate the dash board structure of a vehicle, and the other portion of the supporting structure to which the tray 20 is secured in the storage position is intended to illustrate an upright portion of the vehicle structure in the dash board area.

In the vehicle snack tray of this invention as described in the hereinafter in conjunction with the use of same in the front seat portion of a motor vehicle and more particularly an automobile, it is to be understood that such discussion and description is not to limit the use of the vehicle snack tray to automobiles; and the snack tray is adapted for use in the passenger compartment of any vehicle.

In general the snack tray structure 10 of this invention is adapted to be secured to the dash portion of a vehicle, for example, as in the front seat of an automobile. The forward portion of the supporting structure or the under-dash area of the vehicle is used to provide a place to secure the tray and provide a storing place out of the way of the vehicle occupants. The snack tray structure 10 is adapted to be positioned as shown in the solid lines of FIG. 1, the normal use position, wherein the tray 20 is supported in a substantially horizontal position and can be used to support snack type items or other objects as desired. The snack tray structure 10 is adapted to be folded into a storage position underneath the vehicle dash structure in a position out of the way of the vehicle occupants yet where it can be easily reached and moved to the extended and normal use position.

Figure 2:
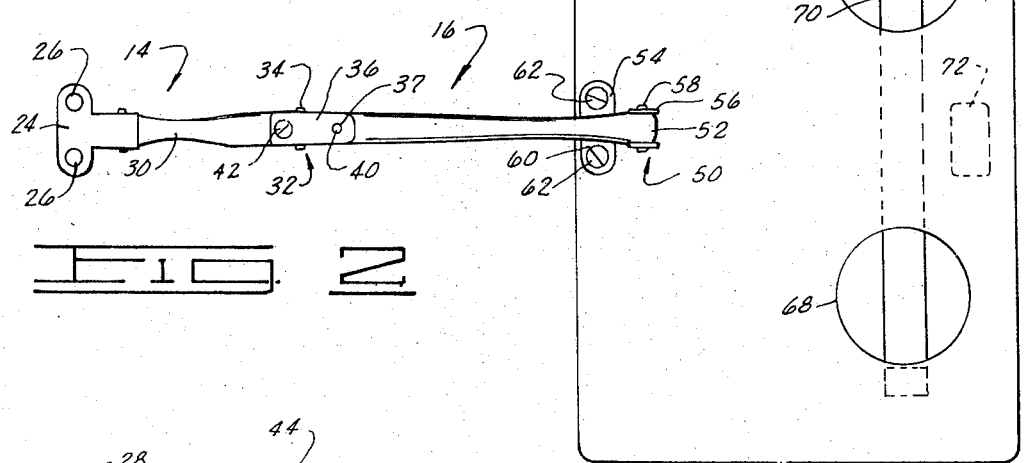
FIG. 2 is a top plan view of the vehicle snack tray structure alone in the extended position.
Figure 3:
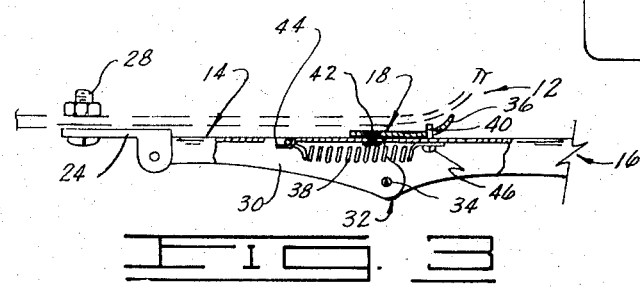
FIG. 3 is an enlarged and partially cut away side elevation view of the mount and adjoining portion of the arm, the mount being attached to a supporting structure shown in dashed lines.
Figure 4:
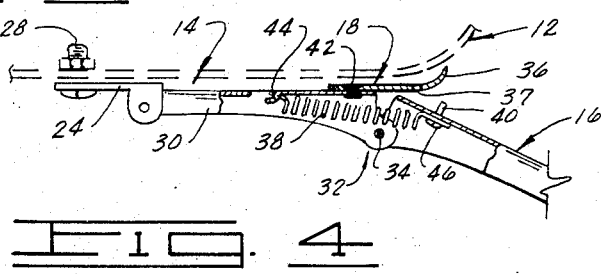
FIG. 4 is an enlarged and partially cut away side elevation view of the mount and adjoining portion of the arm having the arm partially pivoted.

FIG. 2, FIG. 3, and FIG. 4 illustrate structural details of the mount 14 and arm 16. The mount 14 is secured directly to the supporting structure 12. It has a flange 24 with apertures 26 so that it can be secured to the supporting structure 12 by bolts 28. The mount 14 also includes an elongated portion 30 integral with the flange portion 24 and adapted as shown in the drawings to extend to the forward portion of the supporting structure 12. The elongated portion 30 is on its outer end constructed like a hinge having a pivot indicated at 32 connecting that end of the elongated portion 30 with the arm 16. The lock 18 is integrally constructed at the joining ends of the mount 14 and the arm 16. The arm 16 and the end portion of the mount 14 are connected by a pivot pin indicated at 34. As shown in the drawings the elongated portion 30 of the mount 14 and the arm 16 are preferably constructed from channel like members with three sides having the lower portion thereof open.

The lock 18 includes a spring clip 36 on the top end portion of the outer mount end, a spring 38 secured to the arm 16 and the mount 14 inside the channel, and a locking pin 40 extending upward from the arm 16 adapted to pass into an aperture in the spring clip 36. The spring clip 36 is preferably secured to the top side end portion of the mount 14 by a bolt 42, the clip 36 extending a distance past the end of the elongated portion to pass over the attached end of the arm 16 as shown clearly in FIG. 3 and FIG. 4 of the drawing. The spring 38 is preferably a helical spring acting in tension secured on the mount end thereof to a finger-like portion of the mount member 44 integral with the top thereof and extending to the inside of the channel. The other end of the spring 38 is secured with the locking pin 40 on the interior of the arm 16. The locking pin 40 is a fastener with the head thereof 46 on the interior of the arm channel having the spring 38 positioned between the head 46 and the upper portion of the channel. The locking pin 40 is the shank portion of the fastener and is adapted to be held in an aperture 37 in the spring clip 36 as shown in FIG. 3 and FIG. 4. The spring 38 is in tension when the snack tray structure 10 is in the extended position as shown in FIG. 3; it acts upon release of the lock 18 to pull the arm 16 into the storage position and is sized so that when in the storage position the spring will continue to exert a pulling force between the arm 16 and the mount 14 thereby urging it into the storage position.

The arm 16 is basically an elongated channel-like member pivotally secured to the mount 14 at the pivot 32 as described and pivotally secured to the tray 20 on its other end. The arm 16 has a pivotal mount, generally indicated at 50, on its outer end 42 connecting it to a flange 54 which is secured to the tray 20. The flange 54 is shown in FIG. 1 and FIG. 2; it has the upper portion thereof 56 connected by a pivot pin 58 to the outer end of the arm 52, and an integral lower portion 60 which is secured to the tray 20. It is to be noted that the lower portion of the flange 54 extends a distance from the upper portion 56 and in the extended position rests on the open portion of the arm 16 along its outer end portion 52, as shown. The lower portion of the flange 60 is shown secured to the tray 20 by bolts 62. It is to be noted that the flange 54 is constructed so that the tray 20 will pivot about the outer end 52 of the arm 16 and when the tray structure 10 is in the extended position as shown in FIG. 1 the lower flange portion 60 will be underneath the arm 16 and the tray 20 will be in a substantially horizontal position. With the tray structure 10 in this extended position the flange 54 and tray 20 will pivot only in an upward rotating direction relative to the arm 16. Additionally, when the tray structure 10 is in the extended position, the lower portion of the arm 16 is in contact with the lower flange portion 60 and the tray is in the position shown in FIG. 1. When the tray structure 10 is in the stored position as shown in the dashed lines of FIG. 1, the tray 20 and flange 54 are pivoted relative to the arm 16 about the outer arm end portion 52.

The tray 20 as shown in the drawing in FIG. 1 and FIG. 2 has a flat plate-like member indicated at 66 with a pair of apertures 68 therethrough with a bar 70 therebelow adapted to hold beverage containers, and it has a magnetic member 72 secured to the underneath portion of the tray on its outer edge. The tray member 66 as shown is a rectangularly shaped member having two apertures therethrough. However, the tray member 66 can be constructed in variations of this basic and simple design without substantially affecting any features or advantages of the invention. The beverage holder portion of the tray 20 is adapted to receive beverages in containers such as bottles, cans, cups, or the like through the apertures 68 with the bottom of the container resting on the bar 70 below the tray member. The bar 70 has an elongated portion extending underneath the apertures 68 and connected to the bottom surface of the tray member 66. The magnetic member 72 is preferably placed as shown in FIG. 2 relative to the arm and flange structure 16 and 54; it is secured to the underneath side of the tray member 66 as shown in FIG. 1. When the tray structure 10 is in the stored position, the magnetic member 72 contacts an under-dash portion of the supporting structure 12, as indicated at 72 and shown in FIG. 1. The magnetic member 72 is preferably a small piece of magnetic material secured to the edge portion of the tray member 66 by adhesive or by fasteners or the like.

When the tray structure 10 is mounted in a vehicle, the mount 14 is preferably fastened to some supporting structure as hereinbefore described and indicated at 12, preferably when in an automobile the lower turnedunder portion of the vehicle dash board as indicated at 78 in FIG. 1. The mount 14 is attached to the dash 76 generally as indicated wherein the spring clip 36 is at the forward portion of the dash and is given sufficient clearance so the clip 36 can be raised to remove the locking pin 40 from the spring clip aperture 37. Installation of the snack tray structure 10 is simple; the flange 24 can be attached to the dash 76 through the apertures 26 and the flange by using bolts 28. Once the mount 14 is secured to the dash 78 the snack tray structure 10 is ready for use.

In the storage position of the snack tray structure 10 the arm 16 pivots at the pivot point 32 on the mount 14, and the tray 20 pivots at the flange 54 attached to the outer end 52 of the arm 16 and the spring 38 aids in pulling the arm 16 to the storage position. In the storage position the magnetic member 72 contacts a metal portion of the vehicle structure as shown in FIG. 1 where it contacts the portion of the support structure indicated at 74. The exact member which the magnetic member will attach in the storage position depends of course upon the vehicle in which it is installed; in some vehicles it may contact the heater enclosure structure, and in others it may contact the firewall of the vehicle. Yet in some vehicles it may be necessary to install a metallic member to some non-metallic portion of the vehicle structure in order that the magnetic member 72 will have some metallic object to contact. When it is desired to use the snack tray structure 10 for the purpose it was intended, the tray member can be grasped easily by a person simply reaching underneath the dash structure of the vehicle and pulling it so as to disengage the magnetic member 72. As the tray 20 is raised to the extended position, the force of the spring 38 must be overcome as the arm 16 raises to the fully extended position relative to the mount as shown in FIG. 1 and FIG. 3. As the arm 16 is raised to the extended position, the locking pin 40 contacts the lower surface of the spring clip 36 and moves into the aperture 37 whereupon the spring clip 36 moves downward over the locking pin 40 to the final position as shown in FIG. 3.

In the extended and normal use position of the tray structure 10, the tray flange 54 rests on the underneath side of the arm 16 as previously described so the tray member 66 is in a substantially horizontal position. In the extended position the tray 20 will pivot about the outer end of the arm 52 in an upward direction but will not pivot in a downward direction. When the tray structure 10 is in the extended position, it can then be used to support beverage containers, food objects, and other objects as decided by the user. When the snack tray 10 is in the normal use position and it is desired to store the tray, the tray should be first cleared of objects, then the outer end of the spring clip 36 raised to allow the locking pin 40 to move from the aperture 37 and the arm 16 and tray structures 20 pivoted to the storage position. The spring 38 urges rotational motion of the arm 16 relative to the mount 14 and thereby pulls the arm 16 and tray 20 into the storage position. When in the storage position, the magnetic member 72 holds the tray 20 in a fixed position on the vehicle structure.

In the manufacture of the automobile snack tray structure of this invention, it is obvious that the mount structure 14, arm structure 16, and tray structure 20 can be constructed by conventional manufacturing methods and techniques to achieve the end product. The mount structure 14 can be constructed as shown or in an equivalent configuration such being conveniently attachable to the dash structure of a motor vehicle or other structural members of a vehicle on which the tray structure 10 is desired to be installed. The tray structure 20 can be constructed in the basic design as shown in the drawing or can be constructed in other designs having the same basic elements to be stylish or attractive or meet particular and specific needs of a user. The beverage container holder portion of the tray structure 20 can be constructed in a nominal size to hold conventional pop bottles and cans, beer cans, or other containers and can be constructed in a larger or smaller size for a particular use.

In the use and operation of the vehicle snack tray structure of this invention, it is seen that same provides a simple and readily accessible tray structure easily mountable with a conventional vehicle structure adapted to be positioned in an extended position for use or a folded storage position when not in use. It is also seen the snack tray structure 10 is adapted to be mounted with the underneath portion of a vehicle dashboard structure or other supporting structure in a vehicle and is adapted to support the tray structure in an extended position for use at a distance spaced away from the dash or other supporting structure. The tray structure of this invention 10 is also adapted to be easily storable in the attached vehicle structure in a folded position underneath the dashboard structure or other supporting structure. A lock apparatus is provided to hold the tray structure 10 in the extended position and be easily released for retraction of the structure to the folded storage position, such retraction being aided by a spring connected with the support arm portion of the structure.

As will become apparent from the foregoing description of the applicant's vehicle snack tray structure, relatively inexpensive, simple and convenient means have been provided to attach a storable tray structure to a vehicle in the dashboard area. The vehicle snack tray structure is economical to manufacture, simple to use, can be conveniently extended for use or retracted for storage, and can be constructed to be attractive in appearance. The snack tray structure is adapted to be easily mountable with the dashboard structure of a conventional automobile or other vehicle structure and extended for use or retracted underneath the dash structure for storage as desired at the option of the user.

While the invention has been described in conjunction with preferred specific embodiments thereof, it will be understood that this description is intended to illustrate and not limit the scope of the invention, which is defined by the following claims.

I Claim:

1. A tray means, comprising:
   a. a mounting member securable to a means to mount said tray means,
   b. an arm member pivotally secured in one end portion to said mounting member,
   c. a tray member pivotally secured to the other end portion of said arm member,
   d. lock means on said mounting member to fix the position of said arm member relative said mounting member in an extended position,
   e. said mounting member secured to said means to mount said tray means in a depending relation and said mounting member having said arm member attached to one end portion to pivot in a downward relation, f. said arm member including an arm connected to a flange member secured to said tray member in an overlying relation having the pivot thereof at an interior portion of said tray member and on the normally upper portion of said tray member in the extended usage position, g. said lock means having a spring clip means with an aperture therethrough secured to and extending from said mounting member, and a locking pin secured to and extending from said arm member, said locking pin engagable in said aperture to rigidly connect said mounting member and said arm member at the joining portions thereof when in said extended position, and a spring connecting said arm member and said mounting member and acting in tension to bias said arm member and said tray member to the retracted position, said spring biasing said locking pin against said spring clip in the extended position for locking purposes, h. said arm member engaging said flange member in the extended position to prevent downward movement of said tray member when in the extended position, i. said tray member pivotal about said flange member when moved to the storage condition, j. said tray member having a magnetic member mounted thereon opposite said one end poriton constructed and adapted to secure same to said means to mount said tray means in a storage position, and said tray means is adapted to have said tray member and said arm in a horizontal position in said extended position and said tray means is adapted to have said arm pivoted relative said mounting member and said tray member in a folded relation with said magnetic member magnetically attached to said means to mount said tray means in said storage position.

* * * * *